W. DILL.
Clarifying Sugar Juice.

No. 80,340. Patented July 28, 1868.

Witnesses.

Inventor

United States Patent Office.

WILLIAM DILL, OF HOUMA, LOUISIANA.

Letters Patent No. 80,340, dated July 28, 1868.

IMPROVED APPARATUS FOR CLARIFYING SUGAR-JUICE.

*The Schedule referred to in these Letters Patent and making part of the same.*

TO ALL WHOM IT MAY CONCERN:

Be it known that I, WILLIAM DILL, of Houma, in the parish of Terrebonne, and State of Louisiana, have invented a new and useful Improvement in Apparatus for Clarifying Cane-Juice; and I do hereby declare that the following is a full, clear, and exact description thereof, which will enable others skilled in the art to make and use the same, reference being had to the accompanying drawings, forming part of this specification, in which—

Similar letters of reference indicate like parts.

Figure 1:
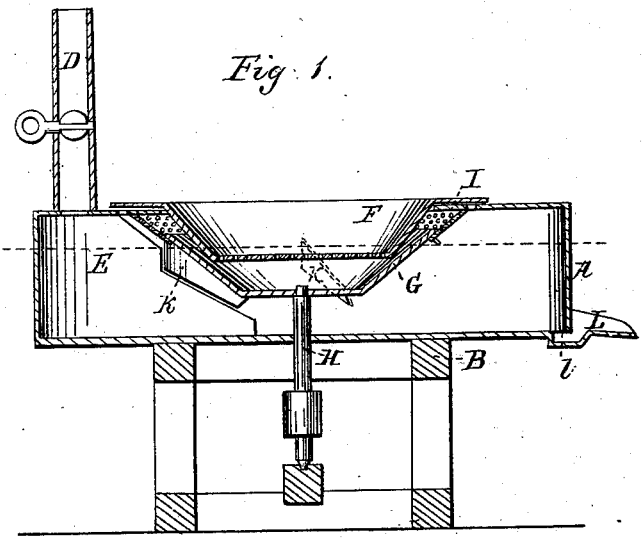
Figure 1 represents a central vertical section of my improved apparatus.
Figure 2:
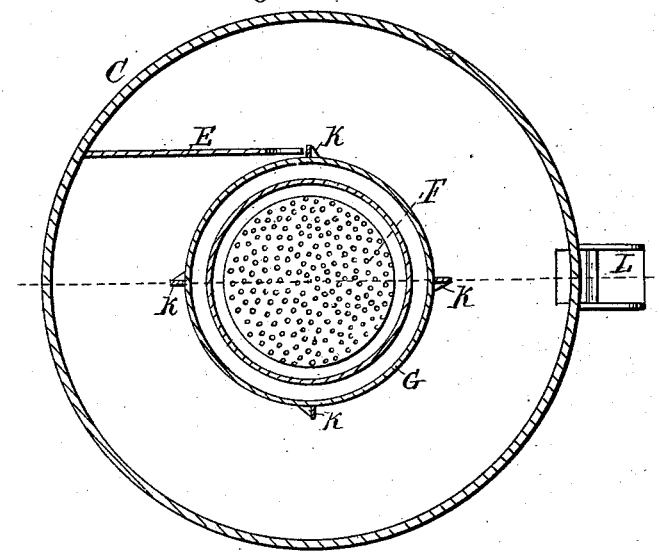
Figure 2 represents a horizontal section of the same, on the line $x\,x$ of fig. 1.

The object of this invention is to provide a simple and effective apparatus for straining and clarifying cane-juice.

It consists of a curb made preferably of sheet metal, provided with a strainer in the top, which sets in an opening in the same, through which the juice passes from the mill into another rotating strainer below the first-named, and within the said curb, which is also provided with wings or fans, suitably arranged, to cause the gas which is used for clarifying, and which is suitably supplied to the interior of the curb, to circulate freely and thoroughly through the said juice, as it is being discharged in jets from the said rotating strainer, as will be more fully described on reference to the accompanying drawings, wherein—

A represents a circular curb, which I make preferably of sheet iron, and arrange on a suitable bench, B. I provide it with an opening, C, for the admission of sulphurous or other suitable gas, which I convey to it in any suitable manner, and a pipe, D, for conveying the gas away, after it has accomplished the desired action on the juice, and I provide a valve for regulating the escape of the same.

E represents a partition in the curb to maintain a proper separation between the in and out-flowing currents of air.

The top of the curb is provided with a large central opening, wherein is placed a strainer, sustained by its flange or rim upon the upper surface of the curb.

G represents another strainer, supported upon the vertical shaft H, by which it receives rotary motion. The strainer G is provided in its conical shell with a perforated section near the top, and with a rim, I, to prevent the juice from flowing over the top.

The centrifugal force generated by the rapid rotation of the strainer G, will cause the juice to flow up to and discharge through the said perforations, distributing it in jets in the upper portion of the curb, whereby it is more thoroughly brought into contact with the gas which pervades the curb.

The strainer G is also provided with vanes K, arranged spirally thereon, and in the proper position to cause the gas to flow in a current upward to meet the said jets of juice as it is emitted from the perforations of the said strainer.

L represents a spout for discharging the clarified juice. It is provided with a recess, $b$, for collecting any sediment that may accumulate in the juice while undergoing the clarifying process.

It will readily be seen that a very thorough exposure of the juice to the gas is effected by this apparatus, which is of simple and cheap construction.

Having thus described my invention, I claim as new, and desire to secure by Letters Patent—

1. The combination, with the curb A, of the rotating strainer G, when constructed substantially as and for the purpose described.

2. The combination, with the strainer G, of the vanes K, substantially as and for the purpose described.

3. The rotary strainer G, constructed and arranged substantially as and for the purpose described.

4. The combination of the strainer F with the curb A and rotary strainer G, substantially as and for the purpose described.

The above specification of my invention signed by me, this 11th day of April, 1868.

WILLIAM DILL.

Witnesses:
R. W. FRANCIS,
M. S. TRAHAN.